United States Patent
Horai

(10) Patent No.: US 10,409,623 B2
(45) Date of Patent: Sep. 10, 2019

(54) GRAPHICAL USER INTERFACE FOR LOCALIZING A COMPUTER PROGRAM USING CONTEXT DATA CAPTURED FROM THE COMPUTER PROGRAM

(71) Applicant: Microsoft Technology Licensing, LLC, Redmond, WA (US)

(72) Inventor: Hiroya Horai, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 470 days.

(21) Appl. No.: 15/166,762

(22) Filed: May 27, 2016

(65) Prior Publication Data

US 2017/0344538 A1 Nov. 30, 2017

(51) Int. Cl.
G06F 9/451 (2018.01)
G06F 17/28 (2006.01)

(52) U.S. Cl.
CPC .......... G06F 9/454 (2018.02); G06F 17/2836 (2013.01)

(58) Field of Classification Search
CPC .............................. G06F 17/2836; G06F 9/454
See application file for complete search history.

(56) References Cited

U.S. PATENT DOCUMENTS

| 5,428,772 A | 6/1995 | Merz | |
|---|---|---|---|
| 6,311,151 B1 * | 10/2001 | Yamamoto | G06F 9/454 704/8 |
| 6,782,529 B2 * | 8/2004 | Kumhyr | G06F 8/33 707/999.202 |
| 7,546,315 B2 * | 6/2009 | Kawada | G06Q 10/10 |
| 8,732,577 B2 | 5/2014 | Jellison, Jr. | |
| 8,942,971 B1 * | 1/2015 | Yin | G06F 9/454 704/2 |

(Continued)

FOREIGN PATENT DOCUMENTS

WO    2014168626 A1    10/2014

OTHER PUBLICATIONS

"Video Game Localization and Translation Services", Published on: Dec. 19, 2008 Available at: http://www.translation-services-usa.com/video_game_localization.php.

(Continued)

*Primary Examiner* — Dino Kujundzic

(74) *Attorney, Agent, or Firm* — Mark K. Young; Mayer & Williams PC

(57) ABSTRACT

Outputs from a graphical user interface of a target computer program are captured during actual use of the target computer program. The captured outputs are processed to recognize strings and associate those strings with content derived from the outputs. The recognized strings and associated content are stored as context data. A translation editing tool accesses the context data and message data of the target computer program. The translation editing tool presents the message data through a graphical user interface to a user. In response to selected text from the message data, the context data are accessed to retrieve content associated with a recognized string that matches the selected text. The retrieved content is presented in the graphical user interface of the translation editing tool to provide contextual information to inform how to translate a message. Text input from the translator can be stored in the message data.

17 Claims, 12 Drawing Sheets

(56) References Cited

U.S. PATENT DOCUMENTS

| | | | |
|---|---|---|---|
| 8,996,354 B1 | 3/2015 | Cook | |
| 9,026,994 B2 | 5/2015 | Zhang et al. | |
| 9,081,769 B2 | 7/2015 | Liu et al. | |
| 9,244,902 B2 | 1/2016 | Lui et al. | |
| 2003/0126559 A1* | 7/2003 | Fuhrmann | G06F 9/454 |
| | | | 715/229 |
| 2004/0260535 A1* | 12/2004 | Chen | G06F 9/543 |
| | | | 704/9 |
| 2006/0174196 A1* | 8/2006 | Zhang | G06F 16/972 |
| | | | 715/236 |
| 2007/0245321 A1 | 10/2007 | Cosgrove et al. | |
| 2007/0300142 A1* | 12/2007 | King | G06Q 30/02 |
| | | | 382/181 |
| 2008/0133216 A1* | 6/2008 | Togami | G06F 9/454 |
| | | | 704/4 |
| 2009/0037830 A1* | 2/2009 | Kulkarni | G06F 9/454 |
| | | | 715/764 |
| 2012/0016655 A1* | 1/2012 | Travieso | G06F 17/2827 |
| | | | 704/2 |
| 2014/0081619 A1* | 3/2014 | Solntseva | G06F 17/289 |
| | | | 704/3 |
| 2014/0122054 A1* | 5/2014 | Takano | G06F 9/454 |
| | | | 704/2 |
| 2015/0134323 A1* | 5/2015 | Cuthbert | G06F 17/289 |
| | | | 704/3 |
| 2015/0269140 A1 | 9/2015 | Fitzpatrick et al. | |
| 2015/0378989 A1 | 12/2015 | Wu et al. | |
| 2016/0350108 A1* | 12/2016 | Joo | G06F 8/71 |

OTHER PUBLICATIONS

Mangiron, et al., "Game Localisation: Unleashing Imagination with 'Restricted' Translation", In the Journal of Specialised Translation, vol. 6, Jul. 2006, pp. 1-6.

"Translate In-Game Japanese Text with OCR (Optical Character Recognition)", Published on: Apr. 15, 2014 Available at: http://wonderpierrot.blogspot.in/2014/04/translate-in-game-japanese-text-with.html.

Austermühl, Frank., "Training translators to localize", In Journal Translation Technology and its Teaching, Intercultural Studies Group, Jan. 2006, pp. 69-81.

* cited by examiner

```
Message Data 400
    target program ID - 402
    Message 1 - 404
        message ID - 406
        natural language 1 content: "Hello, world" – 408
        natural language 2 content: "Bonjour, le monde" - 410
        ...
        natural language content N
    ...
    Message N - 404
        message ID - 406
        natural language 1 content - 408
        Natural language 2 content - 410
        ...
        natural language content N
    Other data 412
```

FIG.4

```
Context Data 500
    target program ID - 502
    Recognized String 1 - 504
        unique ID – 506
        length - 507
        image ID – 508
        scale - 509
        coordinates - 510
    ...
    Recognized String N - 504
        unique ID – 506
        length - 507
        image ID – 508
        scale - 509
        coordinates - 510
        ...

Image data 512
Other data 514
```

FIG.5

GRAPHICAL USER INTERFACE FOR LOCALIZING A COMPUTER PROGRAM USING CONTEXT DATA CAPTURED FROM THE COMPUTER PROGRAM

BACKGROUND

Computer programs generally include a graphical user interface through which a computer communicates both state information and prompts for input. To the extent that this communication is in the form of a natural language, such as English, a computer program typically is "localized" to make the computer program accessible in multiple natural languages. In other words, possible outputs generated by the computer program are stored as translations in multiple natural languages. To support localization, a computer program generally is written so that outputs are defined by an identifier of a message and an identifier of the natural language of the output. The computer program then includes a data structure that stores, for each message identifier, the corresponding message in each of several natural languages.

As an example, a common exercise in an introduction to computer programming is to write a computer program that outputs the text "Hello, world". Such a computer program typically would include an instruction that included a command, such as "output:", and the phrase "Hello, world", i.e., "output: 'Hello, world'". (Note this example does not use an actual computer programming language). To localize this computer program, one could write instead "output: message[x, y]", where "message" is a command that returns a message using an identifier "x" of the desired message as an index in a data structure, and where "y" corresponds to a selected natural language. For example, message "1" can represent a message corresponding to the desired "Hello, world" output. Other values can represent other messages of the computer program. In this example, for "y", let English be "1" and let French be "2". A data structure is created to store "Hello, world" as message[1,1] and "Bonjour, le monde" as message [1,2].

In practice, the localization of a computer program into a large number of natural languages typically is performed by a team of translators, not a computer programmer. The computer programmer, or a team of programmers, typically provides the initial content for messages of a computer program in one natural language. Then, the data structures which store these messages are provided to translators. The translators often use a computer program that accesses these data structures and updates the data structures with translations input by the translators. The computer program typically presents messages from these data structures through a graphical user interface to a translator, and receives input from the translator providing translations for the messages. The translations then are stored in the data structure.

SUMMARY

This Summary is provided to introduce a selection of concepts in a simplified form that are further described below in the Detailed Description. This Summary is intended neither to identify key or essential features, nor to limit the scope, of the claimed subject matter.

One challenge for translators, when localizing software, is providing accurate translations for idiomatic expressions, words with multiple meanings, and other ambiguous terms and phrases. For example, if a message in a computer game includes the English word "block", a translator would need to determine whether the word was intended to signify, for example, a defensive action of a person fighting, or, an object, such as a building component. To address such challenges, contextual information from a computer program being localized is provided to the translator to help the translator to resolve ambiguities in translation. Herein, the computer program being localized is called the target computer program.

Context data from the target computer program is generated by processing outputs presented by the graphical user interface during actual use of the computer program and which are captured during that use. The captured outputs are processed to create the context data. Generally, the context data associates strings, that can be matched to selected text of messages from the graphical user interface of the target computer program, with other content, such as images or audio, that provide context from the graphical user interface of the target computer program. In an example implementation, the context data can be in the form of strings, recognized from images or audio of the graphical user interface of the target computer program captured during actual use of the target computer program, and associations between the strings and the images which are associated with the recognized strings.

A translation editing tool has, as one of its inputs, access to this context data. The translation editing tool also has, as another of its inputs, access to message data of the target computer program to be translated. The message data includes messages, in a first natural language, of the graphical user interface of the target computer program. The translation editing tool presents messages to be translated from the message data through a graphical user interface to a user. In response to selected text of a message, the translation editing tool accesses the context data to retrieve content derived from the graphical user interface of the target computer program and associated with a recognized string that matches the selected text. The retrieved content is presented to the translator through a graphical user interface of the translation editing tool in association with the selected text. Given such a presentation, a translator has contextual information to inform how to translate a message into a second natural language. Text based on input from the translator, in the second natural language, can be stored in the message data.

The computer system includes a capture tool that runs on a first computer running a target computer program. The target computer program has message data, including messages, in a first natural language, of the graphical user interface of the target computer program. The target computer program provides one or more outputs, such as display data at a refresh rate, for its graphical user interface. Other outputs can include audio data, for example. The capture tool accesses the outputs, such as the display data, of the target computer program and stores the accessed outputs in an output file herein called a capture file.

The computer system also includes an analysis tool that runs on a second computer and receives the capture file from the capture tool as an input. The analysis tool processes the capture file to extract context data. For example, the analysis tool can process images to recognize strings in the images. In this example, the analysis tool stores data associating the recognized strings with those images as the context data.

The computer system also includes a translation editing tool that runs on a third computer and receives, as a first input, the context data generated from use of the target computer program and receives, as a second input, the message data of the target computer program. The translation editing tool, in response to translator input, updates the message data with translations of the messages of the target computer program.

An example workflow using such a computer system includes having a first user use the target computer program on the first computer. The capture tool runs during this use and captures data, such as display data, output by the target computer program. After the capture file is created by the capture tool, the capture file is transmitted to the second computer. The analysis tool is run on the second computer to process the capture file and generate the context data. The context data and the message data for the target computer program are transmitted to the third computer. The translation editing tool is run on the third computer using the context data and the message data for the target computer program.

The capture file can be encrypted and the analysis tool can be configured to require authentication before the contents of the capture file can be accessed. The context data and/or message data also can be encrypted, and the translation editing tool can be configured to require authentication before that data can be accessed through the translation editing tool.

In the following description, reference is made to the accompanying drawings which form a part hereof, and in which are shown, by way of illustration, specific example implementations. Other implementations may be made without departing from the scope of the disclosure.

BRIEF DESCRIPTION OF THE DRAWINGS

FIG. 4 is a diagram of an illustrative example of a data structure for message data of a target computer program.

FIG. 5 is a diagram of an illustrative example of a data structure for context data including strings recognized from images of a graphical user interface of the target computer program.

DETAILED DESCRIPTION

Figure 1:
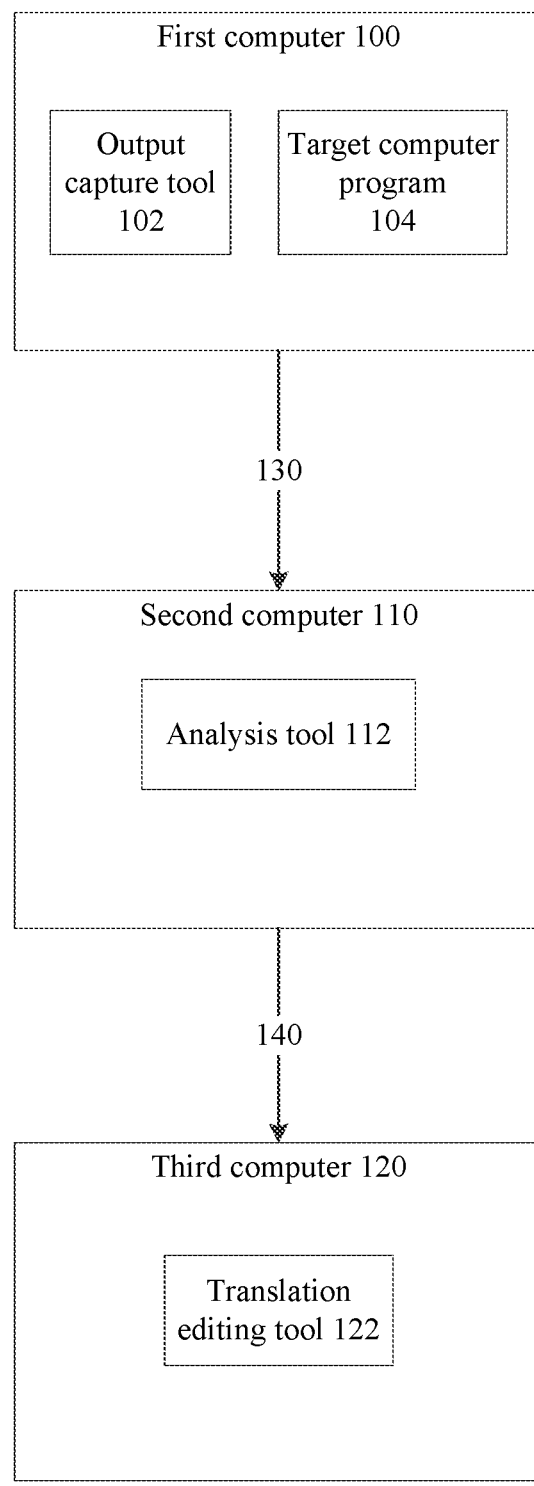
FIG. 1 is a block diagram of an example computer system configured to support localization of a target computer program.

FIG. 1 is a block diagram of an example computer system configured to support localization of a target computer program.

This example computer system includes a first computer 100 running a target computer program 104. The first computer also runs a capture tool 102. The first computer can be implemented using a general purpose computer such as described below in connection with FIG. 12. Examples of such a computer include, but are not limited to, a tablet computer, a slate computer, a notebook computer, a desktop computer, a virtual desktop computer hosted on a server computer, a handheld computer, and a mobile phone including a computer and applications. The system can include a plurality of such first computers 100, to capture data from usage of the target computer program by multiple users, and to capture data from usage of multiple different target computer programs. The first computer typically is used by a first user who uses the target computer program, typically to ensure that the target computer program enters desired states of its graphical user interface. The first user, for example, can configure the first computer to run the capture tool and then run the target computer program.

The target computer program can be any computer program that can be executed on the first computer. Typical examples of such target computer programs include, but are not limited to, computer games, productivity applications such as word processing, spreadsheet, presentation, drawing and other end user applications, operating systems, or any other computer program.

The capture tool captures outputs, such as display data, for the graphical user interface of the target computer program during execution of the target computer program during actual use of the target computer program by a user. The capture tool can be any computer program that can be executed on the first computer, or connected to an output for a presentation device for the first computer, that can capture the output data of the graphical user interface of the target computer program during execution of the target computer program. Other outputs in addition to display data, such as audio data, also can be captured. Data captured by the capture tool can be stored, for example, in a data file in local storage of the first computer, and then transferred to a second computer 110. As an example alternative, the capture tool can store a capture file directly to storage of the second computer. The term "capture file" as used herein is intended to mean any data structure used to store the output data captured from the use of the target computer program.

The example computer system of FIG. 1 also includes a second computer 110. The second computer runs an analysis tool 112, an example of which is described in more detail below in connection with FIGS. 7, 8A and 8B. The analysis tool 112 generates context data from the capture file. The second computer can be implemented using a general purpose computer such as described below in connection with FIG. 12.

The analysis tool is a computer program that executes on the second computer 110. In one example implementation described herein, the analysis tool processes images stored in the capture file. In this implementation, the analysis tool can include an optical character recognition (OCR) component such as an OCR software development kit available from many software publishers, such as, but not limited to: Microsoft Corporation (the MICROSOFT OCR Library for Windows Runtime, or an OCR library that is part of the Windows SDK as Universal Windows Platform (UWP) API), ABBYY (the ABBYY Cloud OCR SDK), Aquaforest Ltd. (the AQUAFOREST OCR SDK), Nuance Communications, Inc. (the OMNIPAGE capture SDK) and Lead Technologies, Inc. (the LEADTOOLS OCR SDK). The OCR component can be on another computer and accessible by the second computer over a computer network or can reside on the second computer.

In another example implementation, the analysis tool processes audio stored in the capture file. This implementation can be an alternative to, or in addition to, processing of images stored in the capture file. In this implementation, the analysis tool can include a speech recognition component, such as a speech recognition software development kit (SDK) available from many software publishers, such as, but not limited to: Microsoft Corporation (the MICROSOFT Speech Platform SDK), Nuance Communications, Inc. (the DRAGON SDK), SRI International (the EDUSPEAK and DYNASPEAK SDK's), and others.

FIG. 1 also illustrates the second computer connected to the first computer through a computer network 130 for transmitting the capture file created by the capture tool to the second computer. The computer network 130 can be a publicly accessible network, such as the internet, or a private computer network. The capture file created by the capture tool also can be transferred from the first computer to the second computer through removable storage or through other data transmission techniques that do not include a computer network.

The computer system also includes a third computer 120. The third computer runs translation editing tool 122, described in more detail below in connection with FIGS. 9 to 11. The third computer can be implemented using a general purpose computer such as described below in connection with FIG. 12. Examples of such a computer include, but are not limited to, a tablet computer, a slate computer, a notebook computer, a desktop computer, a virtual desktop computer hosted on a server computer, a handheld computer, and a mobile phone including a computer and applications. FIG. 1 illustrates the third computer connected to the second computer over a computer network 140 for transmitting context data generated by the analysis tool from the second computer to the third computer. The computer network 140 can be a publicly accessible network, such as the internet, or a private computer network. The context data also can be transferred from the second computer to the third computer through removable storage or through other data transmission techniques that do not include a computer network.

The computer networks 130, 140 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

In one example deployment, the second computer can include a plurality of computers implementing one or more server computers and accessible by a plurality of first computers and a plurality of third computers. Such one or more server computers can implement a service employing the analysis tool to generate context data for multiple target computer programs for use by multiple translation editing tools. In one example deployment, the second computer can be configured to allow the third computer to remotely access the context data for a target computer program without transferring all of the context data to third computer.

In one example deployment, the first and second computers can be the same computer. In another example deployment, the second and third computers can be the same computer. In another example deployment, the first, second and third computers are the same computer.

Figure 2:
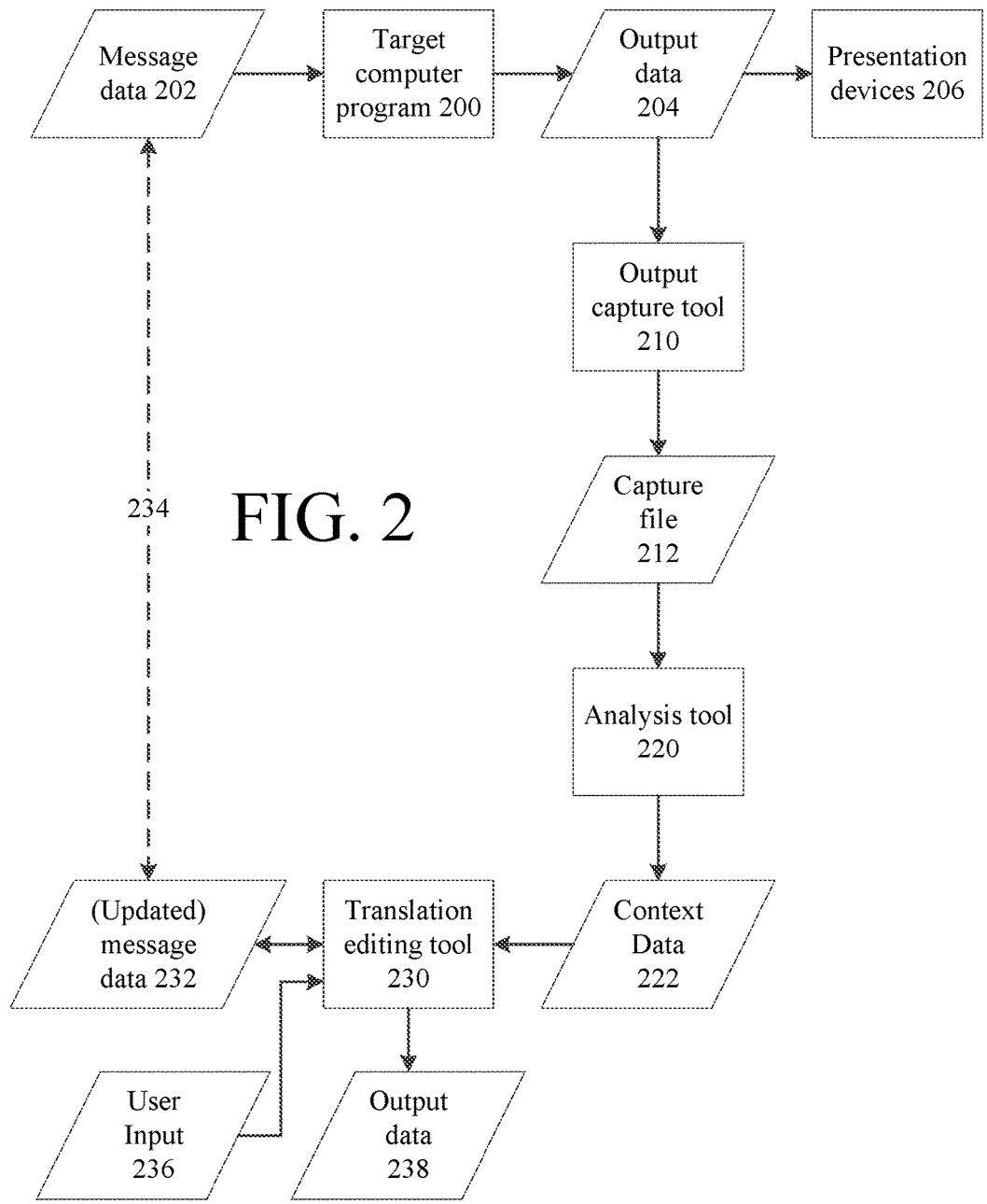
FIG. 2 is a data flow diagram of an example computer system configured to support localization of a target computer program.

Referring now to FIG. 2, a data flow diagram of an example implementation of such a computer system will now be described.

The target computer program 200 has message data 202 including messages for the graphical user interface of the target computer program. The messages generally include text strings in at least a first natural language. The message data can be stored in the form of one or more data files. The target computer program has an output that provides output data 204, such as display data and/or audio, for its graphical user interface. The output data 204 is presented on one or more presentation devices 206, such as a display or speakers.

The capture tool 210 accesses the output data 204 from the target computer program 200 and stores the accessed output data in a capture file 212. For display data, the sample rate of images stored by the capture tool can be equal to or less than a refresh rate of the display data from the target computer program. Any audio data can be recorded at an audio sample rate based on a device used for recording.

The analysis tool 220 receives the capture file 212 as an input. The analysis tool processes the capture file to generate context data 222, which is data derived from the graphical user interface of the target computer program. For example, the analysis tool can recognize strings in the captured data and associate the recognized strings with content derived from the capture file. For example, strings can be recognized in display data using optical character recognition techniques. Strings can be generated by recognizing speech in any recorded audio data. Such strings can be associated with images to which they correspond, e.g., an image from which the string was recognized, or an image displayed at a time corresponding to audio from which the string was recognized. The analysis tool outputs context data 222. In one example implementation, the context data can be stored in the form of a database file that associates recognized strings with other context data, such as an image and a location in that image, providing a database of context information.

The translation editing tool 230 receives the context data 222 as a first input and the message data 202 of the target computer program as a second input. A dashed line 234 indicates that a copy of the message data 202 of the target computer program is provided to the translation editing tool for modification. The translation editing tool has a graphical user interface through which output data 238 is presented to a user, e.g., a translator. The output data can include images from the context data 222 corresponding to strings matching text selected from the message data 232 by the translator. In response to user input 236 of a translation, the translation editing tool updates the message data, as indicated by the updated message data 232, with translations of the messages of the target computer program based on user input. The updated message data 232 can be combined with the target computer program to provide a localized target computer program.

Figure 3:
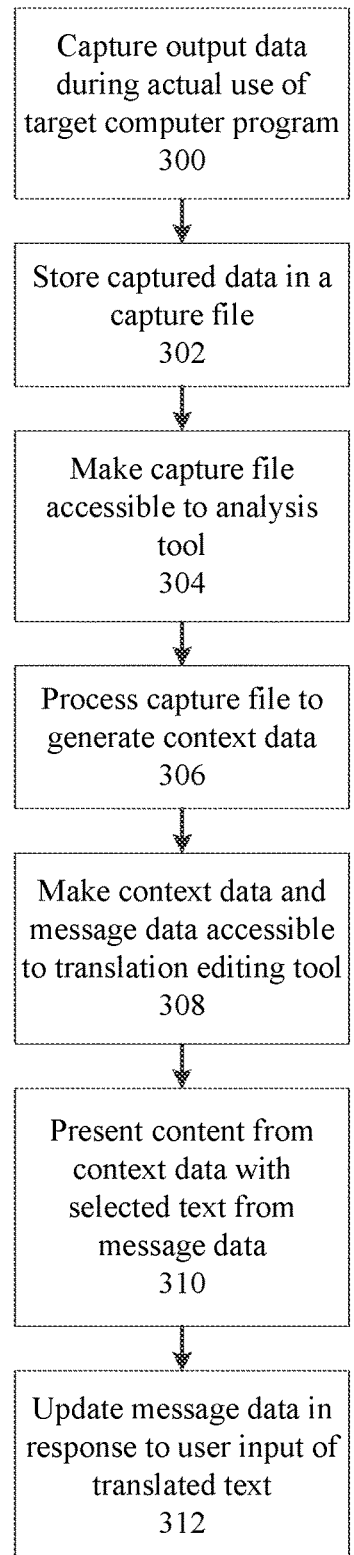
FIG. 3 is a flow chart illustrating an example of operation of the computer system of FIG. 2.

Referring now to FIG. 3, a flow chart of an example operation of such a computer system will now be described.

The first computer, using the capture tool, captures 300 output data from a target computer program during actual use of the target computer program. The capture tool can store 302 the captured output data in a data file, herein called a capture file. The capture file is made accessible 304 to an analysis tool, for example by transferring the capture file to a second computer that runs the analysis tool. The analysis tool then processes 306 the capture file to generate the corresponding context data. In turn the context data is made accessible 308 to the translation editing tool. Similarly, the message data for the target computer program is made accessible to the translation editing tool. For example, the context data and message data can be packaged into an encrypted data file that is transferred to the computer that runs the translation editing tool. The translation editing tool, during use in editing translations of the message data of the target computer program, presents 310 content from the context data in response to input of selected text from the message data. The translation editing tool then processes user input of translated messages to update 312 the message data for the target computer program.

More details of an example implementation of such a computer system and its operation will be described below in connection with FIGS. 4-13.

FIG. 4 is an illustrative example of a data structure for storing message data for a localized target computer program. Such a data structure can be stored in a data file. As an example, a target computer program may output messages of a graphical user interface in a selected natural language by specifying a message file or message data structure, an identifier of the message and an identifier of the selected natural language. For example, the expression of a form "message[x, y]" can be a command that returns a message using an identifier "x" of the desired message as an index in a data structure, and where an identifier "y" corresponds to a selected natural language. Accordingly, as shown in FIG. 4, message data 400 can include an identifier 402 of the target computer program to which it corresponds. Data for a plurality of messages 404, indexed for example by message identifier 406, also are stored. For each message, content for the message in each of a plurality of natural languages is stored, as indicated at 408 and 410. For example, message "1" can represent a message corresponding to the desired "Hello, world" output. In this example, for "y", let English be "1" and let French be "2". The message data includes, and allows retrieval of, "Hello, world" as message[1,1] and "Bonjour, le monde" as message[1,2]. Message data also can include other data 412, such as metadata about its creation date, last modification date and other information.

FIG. 5 is a diagram of an illustrative example of a data structure for context data. In this example, the context data maps strings recognized from images of a graphical user interface of the target computer program to those images. The context data 500 can include an identifier 502 of the target computer program with which it is associated. Any additional data, such as a date and time of creation of the data file or other information, can be stored in one or more additional data fields 514.

The strings recognized in images from the graphical user interface can be represented as one or more records for recognized strings 504. For each recognized string (e.g., "hello world"), a record stores a reference to an image ID 508, which is a unique identifier of the image in which the recognized string is found, and coordinates 510. Coordinates 510 represent at least the location, such as x and y coordinate values, where the recognized string 504 is found within the image having the image ID 508. The coordinates 510 also can include size information for a bounding box in an image that includes the recognized string, such as a height and a width. Each recognized string can have a unique ID 506. For example, the unique ID can be programmatically calculated from the recognized string and the coordinates. In such way, the same string at the same coordinates cannot be added to this database multiple times. A number of characters 507 in the string can be stored. Additionally, a scale factor 509 applied to stored image data also can be stored. While FIG. 5 shows a variable length array of recognized strings, a variety of implementations of a database file storing such data are available. In one example implementation, strings recognized from audio can be associated with one or more images corresponding to the audio. The recognized strings also can be associated with audio content, whether audio from which a string is recognized or audio associated with an image from which the string is recognized. Any other content in the capture file that can be associated with data from which a string is recognized also can be associated with that string.

The context data also can include image data 512, which can include the image data from the capture file or can include a reference to a separate data file storing the images, or to multiple image files that store the image data. Each image ID 508 associated with a recognized string 504 identifies an image stored in this image data. The image ID can be a numerical identifier, or file name, or other information representing the image. In implementations where each image is stored as a separate image file, the image ID can be the image file name. The context data also can include references to any corresponding audio data or other data from, or derived from, the capture file.

The capture file containing output data captured from the target computer program can be stored as a data file containing a sequence of the captured images. The data file can have the format of a conventional video data file. As such, the data file also can store audio data as in a conventional video data file. Alternatively, audio data also can be stored in a separate data file.

The capture file can be encrypted and the analysis tool can be configured to require authentication before the contents of the capture file can be accessed. The context data and/or message data also can be encrypted, and the translation editing tool can be configured to require authentication before this data can be accessed through the translation editing tool.

Figure 6:
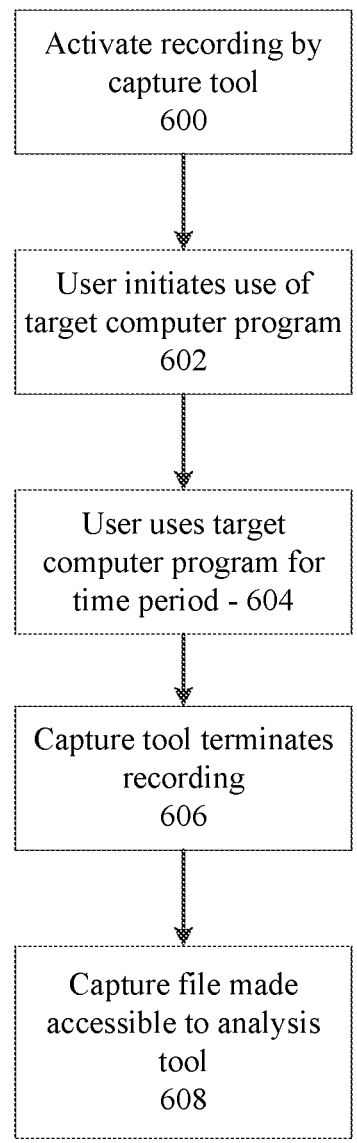
FIG. 6 is a flow chart describing an example of operation of a capture tool.

Turning now to FIG. 6, a flowchart describing an example implementation of an operation of the capture tool will now be described.

The capture tool can be implemented using any tool that can capture and store data output by the target computer program running on a computer to a presentation device of the computer. For example, a screen capture application or a recording device connected to a display output of the computer running the target computer program can capture a sequence of images output by an application. A video camera also can record a video of a display. As another example, an audio capture application or other recording device connected to an audio output of the computer can capture audio data. A microphone also can record audio output by the computer.

Recording by the capture tool is activated 600. A user initiates 602 use of the target computer program, and uses 604 the target computer program for a period of time. The start of the use of the target computer and the start of recording can occur in any order. The use of the target computer program should include one or more scenarios or states of the target computer program for which a translator will be completing a translation. The capture tool can terminate 606 recording, in response to any of a variety of events. For example, termination can occur after a set period of time automatically, or can be in response to a user instruction, or can be in response to termination of use of the target computer program. After terminating recording, the capture file including the captured output data can be made accessible 608 to the analysis tool, for example by transferring the capture file to a computer that runs the analysis tool.

Figure 7:
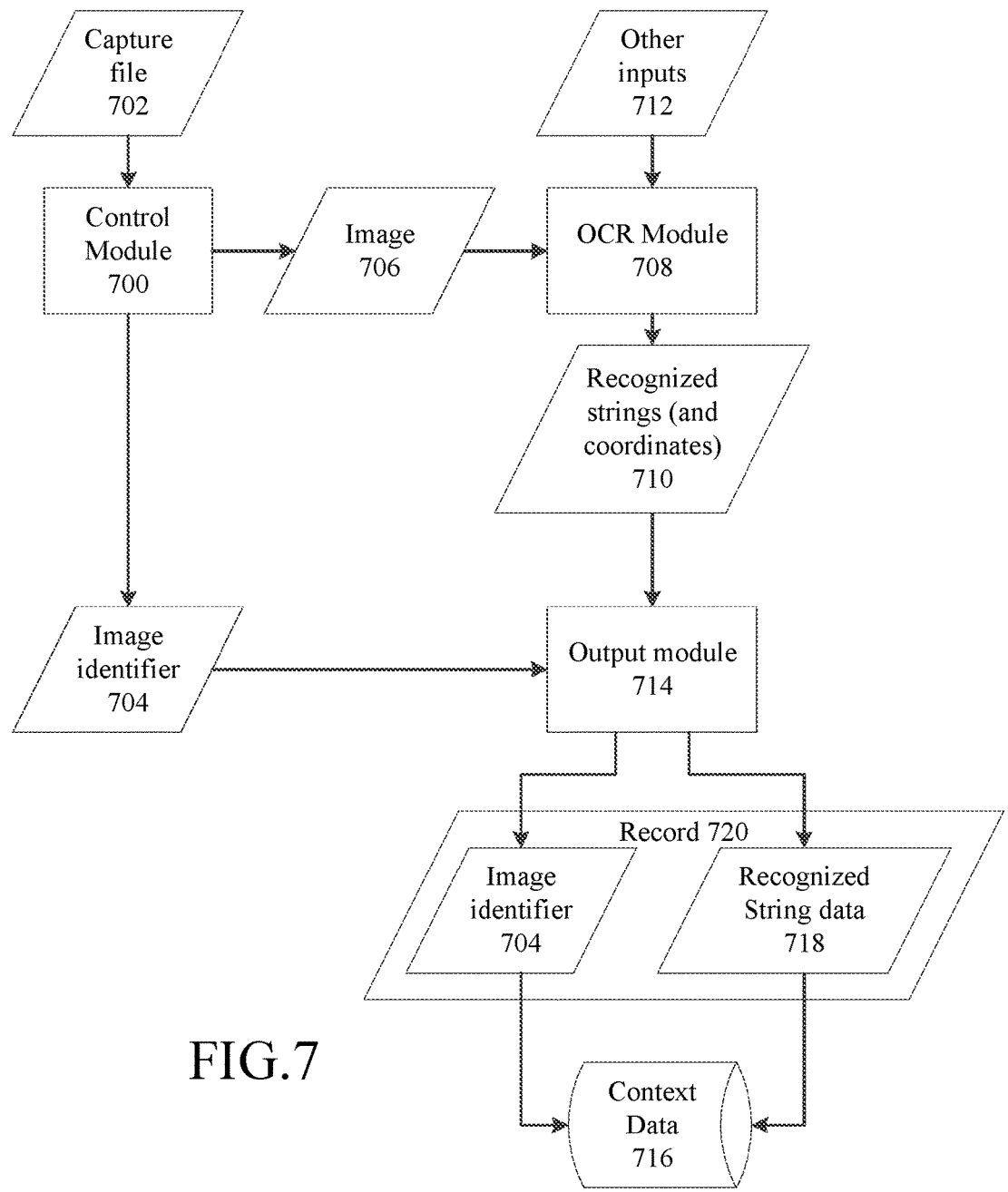
FIG. 7 is a data flow diagram of an example implementation of an analysis tool.

Turning now to FIG. 7, a data flow diagram of an example implementation of the analysis tool will now be described. In this example implementation, the capture file includes image data that is processed using optical character recognition to identify strings in images.

The analysis tool includes a control module 700 which accesses a capture file 702 for processing. In this example, the control module 700 accesses selected images from the capture file 702, and provides an image identifier 704 for each individual image 706 from the capture file that is selected for processing. Only a selection of frames, instead of all of the frames, from the capture file can be processed. For example, a sampling of two frames per second can be used to select frames from the capture file. For some target computer programs which do not have frequent updates in the graphical user interface, even fewer frames can be selected for processing. Each image 706 is input to an optical character recognition (OCR) module 708 which processes the image to extract any strings 710 recognized in the image. A string is a data type implemented as a sequence of characters used in a written form of a natural language, and can include numbers and/or symbols, and can be represented using a form of character encoding. The optical character recognition module 708 can receive external inputs 712, such as user input or text from the message data of the target computer program, or other data, to assist in recognizing strings in an image. The recognized strings 710 can be output as one or more strings, with each string comprising one or more words, and may be associated with coordinates indicating a position in the image at which the string is located. Any conventional optical character recognition program that processes an input image and generates one or more strings per image can be used for this purpose. The recognized string 710 for an image, and the image identifier 704 for that image, are input to an output module 714. The output module 714 generates and stores records 720 that associate data about recognized strings 718, such as the recognized string and coordinates of each string, with an image identifier 704 for the image in which the recognized string was found, in the context data 716.

Figure 8A:
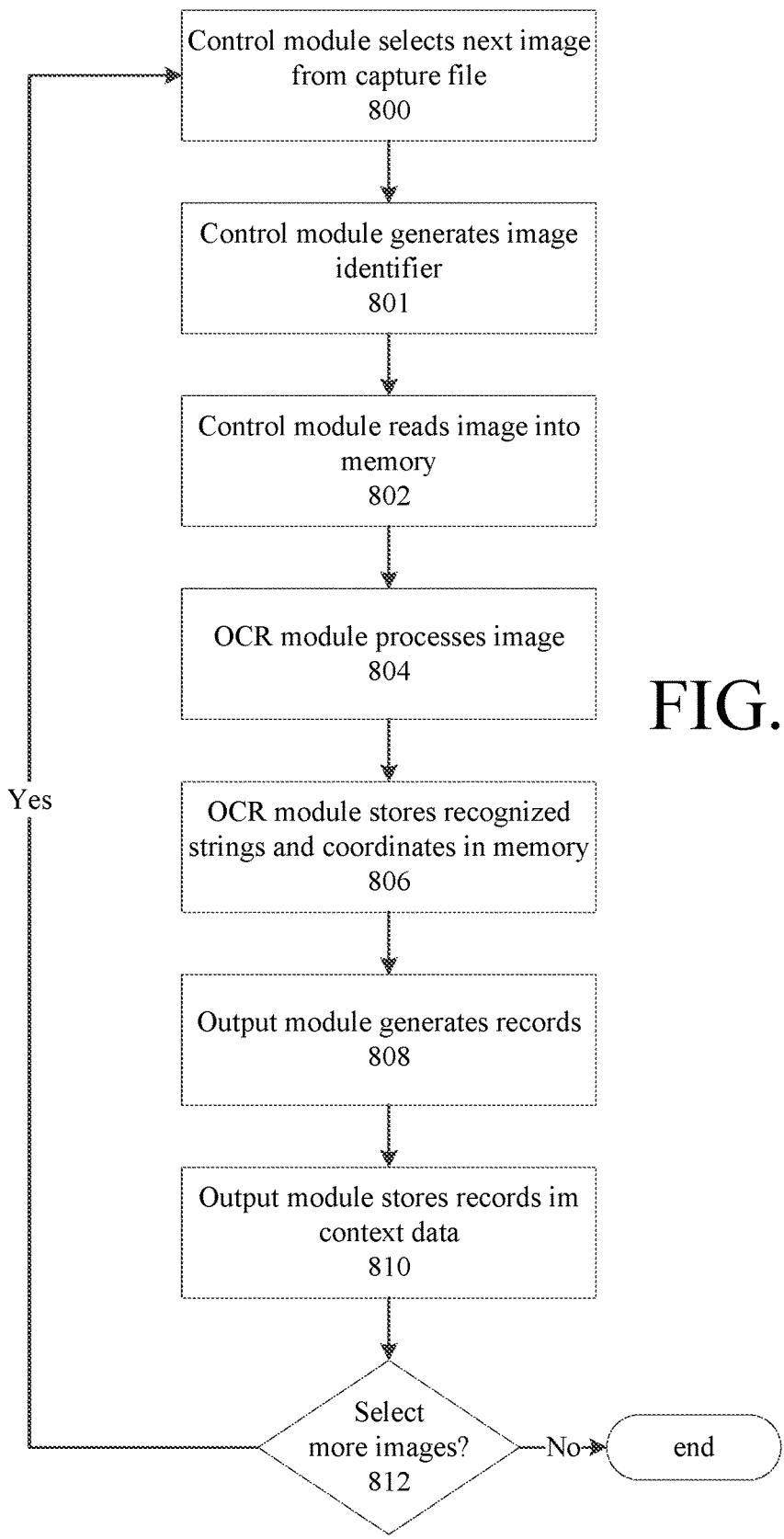
FIG. 8A is a flow chart describing an example of operation of the analysis tool in FIG. 7.

FIG. 8A is a flowchart that describes operation of the example implementation of the analysis module described in FIG. 7. The control module selects 800 a next image from the capture file for processing. The control module generates 801 an image identifier for the selected image. The control module reads 802 the corresponding image into memory from the capture file. The optical character recognition module processes 804 the image in the memory to recognize any strings in the image. The optical character recognition module stores 806 the resulting recognized strings, and the corresponding coordinates in the image, in memory or in a data file in storage. The output module reads the recognized strings and coordinates from memory or storage and processes 808 them to generate records in the context data, pairing each recognized string with the corresponding image identifier. The output module stores 810 the resulting records in the context data. The process is repeated for each image selected from the capture file as indicated at 812.

More particularly, each recognized string can have associated data, such as, but not requiring or limited to, an image identifier of the image, coordinates of the string in the image, and a unique identifier. The output module adds a record for each recognized string into the context data, such as one described in FIG. 5.

Usually, sequential images generated by the graphical user interface of the target computer program, as captured in the capture file, are very similar and contain many of the same strings in the same position. Various techniques can be used to avoid duplicate entries in the context data for the same recognized string. As an example, if having many of the same strings with same coordinates in the context data are not preferred, the output module can compute a unique identifier from at least the recognized string and its coordinates. The output module can ensure that only one record is stored for each such unique identifier.

Images of the graphical user interface of the target computer program also can consume a substantial amount of computer storage. To reduce storage requirements for the context data, the output module can apply a scale ratio, which can be a user setting or an automatic setting, and which can be adjustable per image. The scale ratio represents a desired ratio of the size of the original image from the capture file to the size of its corresponding image in the context data. The output module can resize images from the capture file to smaller size images, in terms of pixel resolution, that are stored in the context data. The output module also can apply data compression to further reduce the amount of data used to represent each image. The output module also can store any information about the scale ratio and/or any compression format in the context data.

Figure 8B:
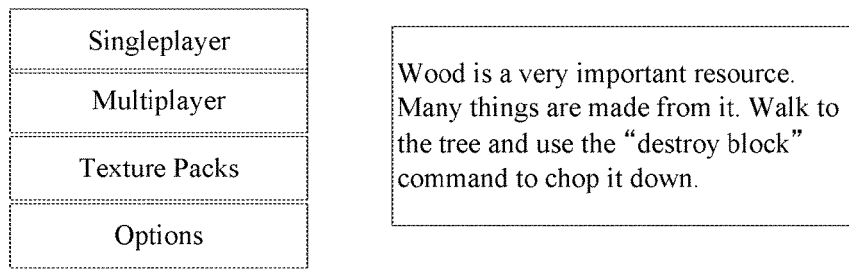
FIG. 8B is an illustrative example of graphical user interface images from a target computer program, with multiple lines of text.

Each image can have multiple text areas. An OCR module may detect such multiple text areas as individual strings. For example, FIG. 8B shows two examples of a target computer program's graphical user interfaces. User interface 851 has four strings: "Singleplayer", "Multiplayer", "Texture Packs" and "Options". User interface 852 has one long string rendered in four lines: "Wood is a very important resource." is one line; "Many things are made from it. Walk to" is a second line. Storing only the individual recognized strings separately in the context data can impact the quality of matching of the recognized strings to messages in the message data for a target computer program when the context data is used by the translation editing tool.

To improve quality of matching in the translation editing tool, in one implementation, the output module, in addition to adding the individual strings, adds combinations of concatenated neighboring strings to the context data. A variety of techniques can be used to generate concatenations of strings, such as adding all possible combinations of two or more adjacent lines. Partial strings also may be used. By adding such combinations of strings to the context data, multiline string matching can be performed when the context data is used in the translation editing tool. As shown in FIG. 8B, in the example of 851, combinations such as "Singleplayer Multiplayer", "Multiplayer Texture Packs", . . . , "Multiplayer Texture Packs Options", . . . , "Singleplayer Multiplayer Texture Packs Options" can be stored in the context data. In the example of 852, a combination such as "Wood is a very important resource. Many things are made from it. Walk to", combining the first two lines, can be stored in the context data. Note that these examples are based on an English language source, in which whitespace is added between strings to concatenate the strings; but other languages may apply different methods to concatenate strings.

Figure 9:
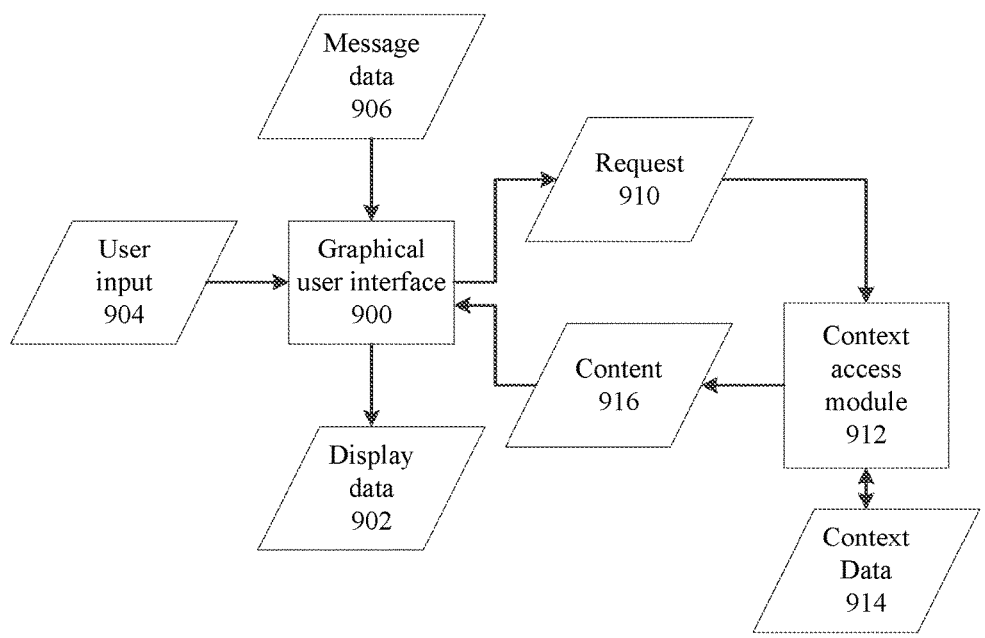
FIG. 9 is a data flow diagram of an example implementation of a translation editing tool.
Figure 10:
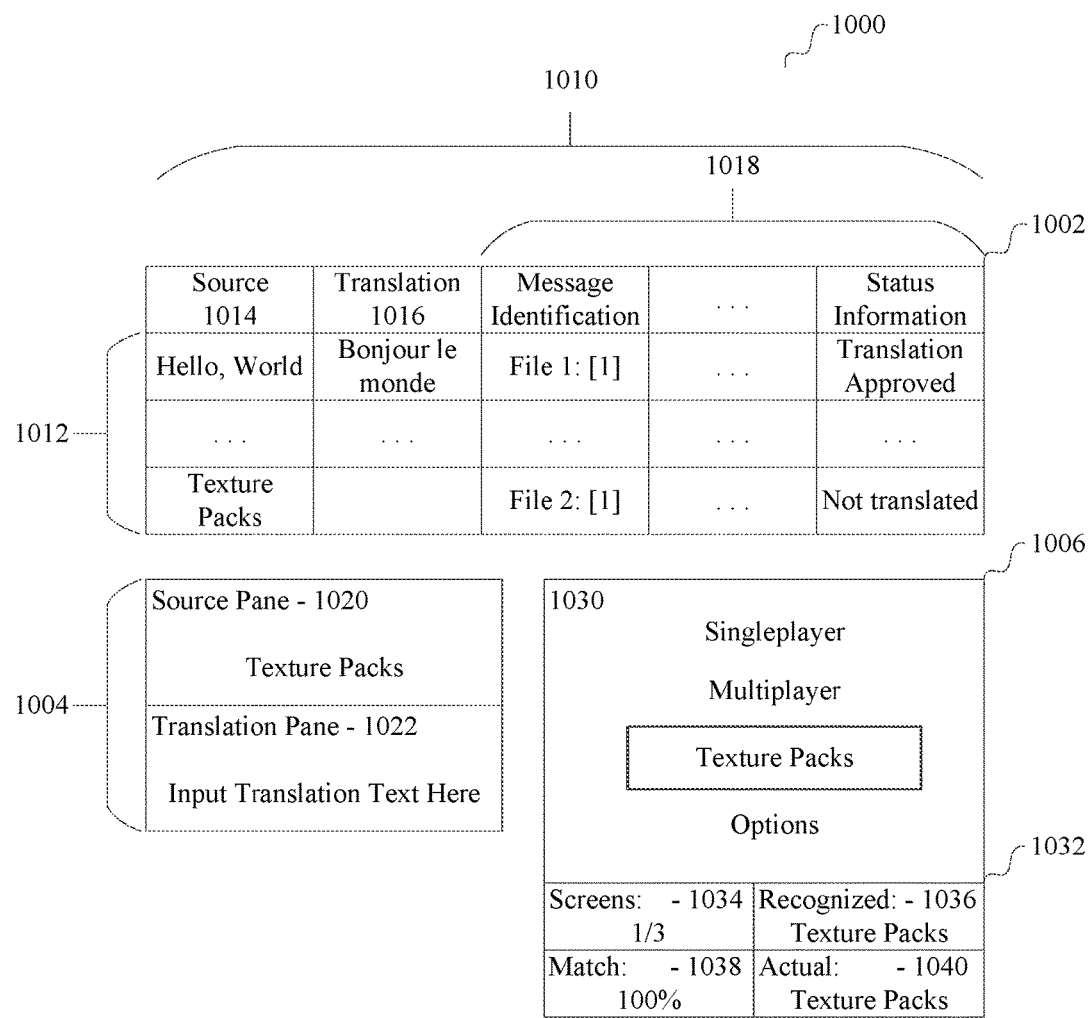
FIG. 10 is an illustration of an example graphical user interface for a translation editing tool illustrating an image displayed in association with text.
Figure 11:
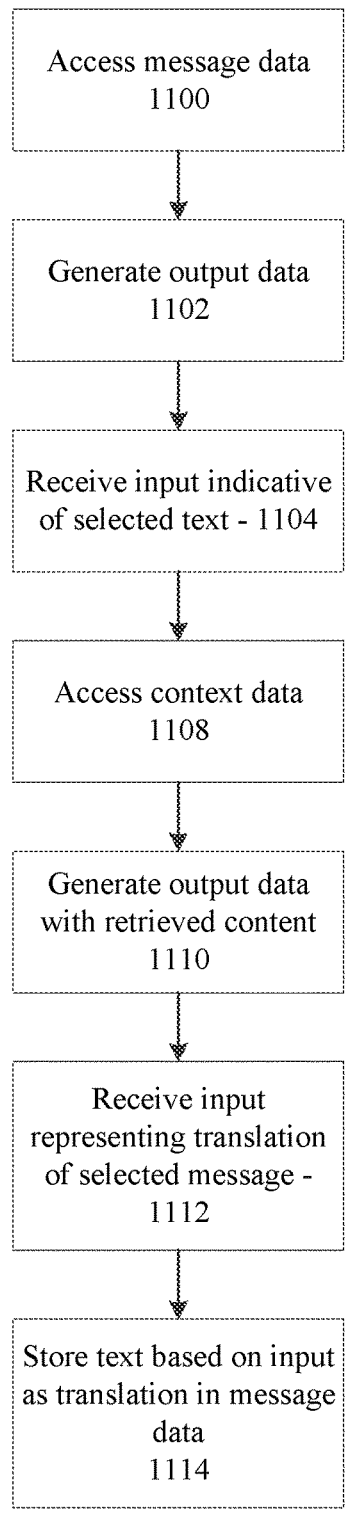
FIG. 11 is a flow chart describing an example of operation of the translation editing tool.

Turning now to FIGS. 9-11, and given context data derived for a target computer program, operation of an example implementation of a translation editing tool will now be described. In this example, the context data includes recognized strings associated with images from which those strings were recognized. FIG. 9 is a data flow diagram of an example implementation of a translation editing tool. The translation editing tool includes a graphical user interface module 900 that generates output data 902 for a graphical user interface and processes related user input 904 from user input devices. An example graphical user interface is described in more detail below in connection with FIG. 10. In general, the graphical user interface presents one or more messages from the message data 906 for the target computer program, from which the user can select one or more messages, or one or more words within one or more messages. The translation editing tool also may automatically select and present messages or portions of messages for translation. A user can then input text for a corresponding translation for the selected message through user input 904. To assist the user in creating a translation, the selected words of the selected message, also called the selected text, are transmitted in a request 910 to a context access module 912. The context access module, in response to a request 910, accesses the context data 914 for the target computer program. The context access module compares the selected text to recognized strings stored in the context data to identify one or more recognized strings that approximately match the selected text. For each identified string in the context data, the context access module retrieves content 916 corresponding to the identified strings, and provides that content to the graphical user interface module. The graphical user interface module 900 incorporates the retrieved content 916 into the output data 902 for the graphical user interface.

To compare the selected text to the recognized strings stored in the database, the context access module can apply any of a number of string comparison algorithms. For example, because an OCR module can introduce errors in recognized strings, the string comparison algorithm can be implemented so as to execute approximate, or "fuzzy", matches. As an example, the context data can be implemented using a database that supports full-text searching operations with query operators that can be applied to strings. An approximate matching mechanism can be implemented with query operators that find one or more substrings within a string. For example, a "near" operator can identify strings in which two substrings are near each other: the operation "TermA Near/N TermB" means that TermA and TermB are less than N+1 words apart from each other. As another example, a "match" operation can identify strings including a substring: the operation [Match "Tokyo"] can retrieve records having the string "Tokyo Station" or "Center of Tokyo". Some systems use a wildcard operator to provide a similar result. As an example, an SQLite database is a relational database that supports full-text search with a "Near" operator. In this example, an initial query on the context data, given the selected text, can retrieve a set of candidate entries. For example, if the selected text is a single word or other string, a "match" query can be applied to the database to retrieve all entries that begin with or that contain the word or string. If the selected text includes multiple words or strings, a "near" query can be built from the words of the selected text and applied to the database to retrieve all entries that contain the words in approximately the same order. Additionally, the candidate entries can be limited by the number of characters in the recognized string as compared to the number of characters in the selected text. For each of the candidate entries, a similarity or distance metric between the recognized string of the entry and the selected text is calculated. A variety of other similarity or distance metrics can be used. For example, any edit distance metric can be used. An example distance metric that can be used is a Levenshtein distance metric. Approximate matches having a measure of distance or similarity over a given threshold can be selected and sorted based on this measure by the context access module, and presented in sorted order by the translation editing tool.

An illustrative example of an image of a graphical user interface for a translation editing tool will now be described in connection with FIG. 10. In this example, the graphical user interface presents images associated with recognized strings that match selected text from message data for a target computer program. In the example in FIG. 10, the interface is illustrated and described as includes several panes of the graphical user interface which are non-overlapping and non-modal with the other panes of the interface. Such information also can be conveyed using other graphical user interface techniques. A modal dialog box, a call-out interface, overlapping windows, or pop-up window also are examples of a kind of interface that can be used to convey message data and/or content based on context data.

The graphical user interface 1000 includes a message data display area 1002 for displaying message data from the target computer program. In this example, the message data is in the form of a structured data file, such as an XML file or spreadsheet, which can be readily transformed into a display of rows 1012 and columns 1010. Thus the message data display area includes multiple rows, one for each source message to be translated. In each row, the message data display area includes, for a given message, the word or words 1014 of the message in a first natural language, the word or words for its corresponding translation 1016 into a second natural language, and optionally other information 1018 related to the message. Such other information can include, but is not limited to, message identification information (e.g., a file name for a data file from which message data was retrieved, a message identifier), and status information related to the translation (e.g., has the message been translated and/or has the translation been approved). Any row of the message data display area can be selected in response to user input as a currently selected message; all of, or a portion of, the text within a currently selected message can be selected. The translation editing tool may automatically select a message or portion of a message.

The graphical user interface 1000 also can include an editing display area 1004 for allowing a user to enter a translation for a currently selected message. The editing display area 1004 can include, for example, a source pane 1020 and a translation pane 1022. The source pane can display text in the source natural language for the currently selected message. The translation pane can be an input field through which a user can enter text in the target natural language as the translation to be associated with the currently selected message.

The graphical user interface 1000 also includes a content display area 1006 for presenting content received based on the context data. For example, content display area 1006 can display images resulting from a search of the context data for a recognized string that approximately matches the selected text from the currently selected message. In this content display area 106, an image can be displayed in an image pane 1030. Using the coordinate data for the recognized string in the context data, the recognized string can be highlighted on the displayed image, for example by drawing a box around that text. Additional data about the displayed image can be displayed in a data pane 1032. In this example interface, the data pane includes a search count indicator 1034 which conveys to the user the number of matches to the currently selected text. For example, the search count indicator 1034 can include a total number of images or screens, and an indicator of which image from that set is currently being viewed. The recognized string corresponding to the currently displayed image can be displayed at 1036. A confidence indicator 1038 can be displayed as a value indicative of how well the currently selected text matches the recognized string corresponding to the displayed image, which may be a function of the similarity or distance metric used to identify this string as a match. The actual text 1040 in the source natural language of the currently selected message also can be displayed in the data pane, adjacent to the recognized string, to assist the user in determining how well the currently displayed image corresponds to the currently selected text.

Turning now to FIG. 11, a flowchart describes an illustrative example of operation of the translation editing tool. The graphical user interface module receives 1100 the message data for the target computer program, and generates 1102 display data based on the message data. The graphical user interface module receives 1104 an input indicative of a selection of a message, and optionally one or more words in the selected message, as selected text. In response to the selected text, the graphical user interface module requests corresponding content from the context access module. In response to the request, the context access module accesses 1108 the context data to retrieve content corresponding to recognized strings that match the selected text, and provides this content to the graphical user interface module. The graphical user interface module then generates 1110 output data with the retrieved content. The graphical user interface module also receives 1112 user input indicative of translated text for a selected message. In response to user input, the graphical user interface module can store 1114 any text based on the input as the translation for a selected message in the message data.

The translation editing tool also can have a mode of operation in which an individual reviews and approves translations. Such a mode of operation is similar to the operation described in FIG. 11, however, the graphical user interface module receives input indicative of whether an existing translation for a selected message is approved. Such an input can be entered, for example, if one of the status information columns at 1018 in FIG. 10 is an input field. A variety of user interface mechanisms can be provided to allow for such an input. In response to such an input, the message data can be updated to indicate that a translation is approved. The graphical user interface of FIG. 10 thus can provide context information in the approval process.

Figure 12:
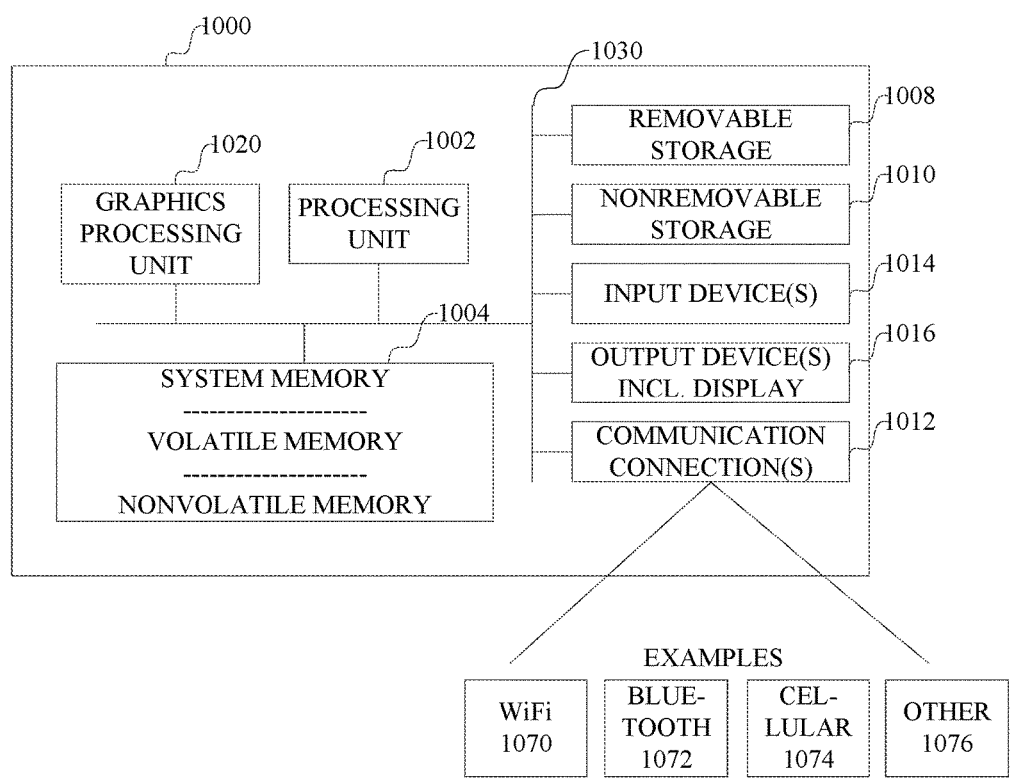
FIG. 12 is a block diagram of an example computer.

Having now described an example implementation, FIG. 12 illustrates an example of a computer with which such techniques can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 12, a computer 1200 includes at least one processing unit 1202 and memory 1204. The computer can have multiple processing units 1202 and multiple devices implementing the memory 1204. A processing unit 1202 can include one or more processing cores (not shown) that operate independently of each other. Additional co-processing units also can be present in the computer. The memory 1204 may include volatile devices (such as dynamic random access memory (DRAM) or other random access memory device), and non-volatile devices (such as a read-only memory, flash memory, and the like) or some combination of the two. Other storage, such as dedicated memory or registers, also can be present in the one or more processors. The computer 1200 can include additional storage, such as storage devices (whether removable or non-removable) including, but not limited to, magnetically-recorded or optically-recorded disks or tape. Such additional storage is illustrated in FIG. 12 by removable storage device 1208 and non-removable storage device 1210. The various components in FIG. 12 are generally interconnected by an interconnection mechanism, such as one or more buses 1230.

A computer storage medium is any medium in which data can be stored in and retrieved from addressable physical storage locations by the computer. A computer storage medium thus can be a volatile or nonvolatile memory, or a removable or non-removable storage device. Memory 1204, removable storage 1208 and non-removable storage 1210 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 1200 may also include communications connection(s) 1212 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 1212 are devices, such as a wired network interface, wireless network interface, radio frequency transceiver, e.g., WiFi 1270, cellular 1274, long term evolution (LTE) or Bluetooth 1272, etc., transceivers, navigation transceivers, e.g., global positioning system (GPS) or Global Navigation Satellite System (GLONASS), etc., or other devices 1276 that interface with communication media to transmit data over and receive data from the communication media.

The computer 1200 may have various input device(s) 1214 such as a pointer device, keyboard, touch-based input device, pen, camera, microphone, sensors, such as accelerometers, thermometers, light sensors and the like, and so on. The computer 1200 may have various output device(s) 1216 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 1210, communication connections 1212, output devices 1216 and input devices 1214 can be integrated within a housing with the rest of the computer, or can be connected through various input/output interface devices on the computer, in which case the reference numbers 1210, 1212, 1214 and 1216 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 12.

The various modules, tools, or applications, and data structures and flowcharts of FIGS. 1-9 and 11, the graphical user interface in FIGS. 10, as well as any operating system, file system and applications on a computer in FIG. 12, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer comprises a graphical user interface module executing on a processing unit of the computer and comprising: a first input accessing message data from computer storage accessible to the computer, the message data comprising data corresponding to messages, in a first natural language, of a graphical user interface of a target computer program, an output providing output data, generated using at least the message data, for presentation on a presentation device, and a second input receiving user input. The computer also comprises a context access module executing on a processing unit of the computer and operative, in response to selected text corresponding to a message in the message data, to access context data from computer storage accessible to the computer, wherein the context data comprises data derived from the graphical user interface of the target computer program, to retrieve content associated with a string that matches the selected text, and having an output providing the retrieved content to the graphical user interface module. The graphical user interface module is operative, in response to receiving the retrieved content, to generate the output data including the retrieved content in association with the selected text. The graphical user interface module is operative, in response to an input with respect to a selected message, to update data for the selected message in the message data based on the input.

In another aspect, a computer-implemented process performed by a computer program executing on a computer, comprises accessing message data from computer storage accessible to the computer, the message data comprising messages, in a first natural language, of a graphical user interface of a target computer program. An input indicative of selected text corresponding to a message in the message data is received. Context data is accessed from computer storage accessible to the computer, wherein the context data comprises data derived from the graphical user interface of the target computer program, to retrieve content associated with a string that matches the selected text. Output data, including the retrieved content in association with the selected text, is generated for presentation on a presentation device. Input with respect to a selected message is received, and data for the selected message in the message data is updated based on the input.

In another aspect, a computer includes means for accessing context data, derived from the graphical user interface of the target computer program, to retrieve content associated with a string that matches the selected text from messages data, and means for presenting the context data in association with the selected text. The computer can store text in the message data for a translation corresponding to the selected text.

In another aspect, a computer includes means for processing output data from a target computer program to generate context data, wherein the context data comprises data derived from output data of the target computer program, including strings recognized from the output data associated with content derived from the output data.

In any of the foregoing aspects, the input with respect to a selected message can be a translation, into a second natural language, of the selected message. The translation is stored in the message data as the translation in the second natural language of the selected message.

In any of the foregoing aspects, the input with respect to a selected message can be an indication of approval of a translation, and data indicative of the approval of the translation is stored in the message data.

In any of the foregoing aspects, the output data can include display data of the graphical user interface of the target computer program. The display data can be processed using optical character recognition to recognize strings in the display data.

In any of the foregoing aspects, the output data can include audio data of the graphical user interface of the target computer program. The audio data can be processed using speech recognition to recognize strings in the audio data.

In any of the foregoing aspects, the data derived from the graphical user interface of the target computer program can include strings, recognized from outputs of the graphical user interface of the target computer program captured during actual use of the target computer program, and associations between the strings and images of the graphical user interface of the target computer program captured during the actual use of the target computer program.

In any of the foregoing aspects, the display data can include an editing pane displaying the selected text corresponding to the message in the message data and an image pane displaying images retrieved from the context data. A plurality of retrieved images can be displayed sequentially in the image pane.

In any of the foregoing aspects, the graphical user interface can include an indication of confidence of a match between selected text and a string corresponding to the retrieved content.

In any of the foregoing aspects, the context data can include, for a recognized string from an image, a location of the string in the image. When an image corresponding to a string that matches the selected text is displayed, a highlight of the string can be displayed in the image.

In any of the foregoing aspects, the context data can be stored as a database associating strings with content derived from the graphical user interface of the target computer program. The database can be stored for access using queries on recognized strings in a structured query language.

In any of the foregoing aspects, accessing context data includes matching selected text to recognized strings in the context data. In one implementation, an edit distance metric is used to measure similarity between the selected text and recognized strings in the context data. In one implementation, a set of candidate recognized strings is limited by string length based on string length of the selected text.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer comprising:
a graphical user interface module comprising computer program instructions executing on a processing unit of the computer and comprising:
a first input accessing message data from computer storage accessible to the computer, the message data comprising data corresponding to messages, in a first natural language, of a graphical user interface of a target computer program,
an output providing output data, generated using at least the message data, for presentation on a presentation device, and
a second input receiving user input including data indicating selected text corresponding to a message in the message data; and
a context access module comprising computer program instructions executing on the processing unit of the computer and, in response to receiving the data indicating the selected text from the graphical user interface module, operative to:
access context data from the computer storage accessible to the computer, wherein the context data comprises data including strings derived from the graphical user interface of the target computer program, wherein the strings are recognized from outputs of the graphical user interface of the target computer program captured during actual use of the target computer program, and the data further including associations between the strings and images of the graphical user interface of the target computer program captured during the actual use of the target computer program, and
retrieve content associated with a string that matches the selected text, and having an output providing the retrieved content to the graphical user interface module;
wherein the graphical user interface module is operative, in response to receiving the retrieved content from the context access module, to generate the output data on the output, the output data further including the retrieved content in association with the selected text; and
wherein the graphical user interface module is operative, in response to an input with respect to a selected message, to update data for the selected message in the message data based on the input.

2. The computer of claim 1, wherein the output data of the graphical user interface module includes display data comprising an editing pane displaying the selected text corresponding to the message in the message data and an image pane displaying images retrieved from the context data.

3. The computer of claim 2, wherein the graphical user interface module is operative to display a plurality of retrieved images sequentially in the image pane.

4. The computer of claim 1, wherein the output data of the graphical user interface module further includes an indication of confidence of a match between the selected text and the string corresponding to the retrieved content.

5. The computer of claim 1, wherein the context data further includes, for a recognized string from an image, a location of the string in the image.

6. The computer of claim 5, wherein the retrieved content comprises an image corresponding to the string that matches the selected text, and wherein, when the graphical user interface module displays the image, the output data from the graphical user interface module further includes a highlight of the string in the image.

7. An article of manufacture comprising:
computer storage,
computer program instructions stored on the computer storage and defining a translation editing tool which, when processed by a computer, cause the computer to perform functions, in which the computer comprising:
a graphical user interface module comprising:
a first input configured to access message data from computer storage accessible to the computer, the message data comprising data corresponding to messages, in a first natural language, of a graphical user interface of a target computer program,
an output providing output data, generated using at least the message data, for presentation on a presentation device, and
a second input configured to receive user input including data indicating selected text corresponding to a message in the message data; and
a context access module, in response to receiving the data indicating the selected text from the graphical user interface module, operative to:
access context data from the computer storage accessible to the computer, wherein the context data comprises data including strings derived from the graphical user interface of the target computer program, wherein the strings are recognized from outputs of the graphical user interface of the target computer program captured during actual use of the target computer program, and the data further including associations between the strings and images of the graphical user interface of the target computer program captured during the actual use of the target computer program, and
retrieve content associated with a string that matches the selected text and provide the retrieved content to the graphical user interface module;
wherein the graphical user interface module is operative, in response to receiving the retrieved content from the context access module, to generate the output data on the output, the output data further including the retrieved content in association with the selected text; and
wherein the graphical user interface module is operative, in response to an input with respect to a selected message, to update data for the selected message in the message data based on the input.

8. The article of manufacture of claim 7, wherein the output data of the graphical user interface module includes display data comprising an editing pane displaying the selected text corresponding to the message in the message data and an image pane displaying images retrieved from the context data.

9. The article of manufacture of claim 8, wherein the graphical user interface module is operative to display a plurality of retrieved images sequentially in the image pane.

10. The article of manufacture of claim 7, wherein the output data of the graphical user interface module further includes an indication of confidence of a match between the selected text and the string corresponding to the retrieved content.

11. The article of manufacture of claim 7, wherein the context data further includes, for a recognized string from an image, a location of the string in the image.

12. The article of manufacture of claim 11, wherein the retrieved content comprises an image corresponding to the string that matches the selected text, and wherein, when the graphical user interface module displays the image, the output data from the graphical user interface module further includes a highlight of the string in the image.

13. A computer-implemented process performed by a computer program executing on a computer, comprising:
accessing message data from computer storage accessible to the computer, the message data comprising messages, in a first natural language, of a graphical user interface of a target computer program;
receiving an input indicative of selected text corresponding to a message in the message data;
in response to receiving the input indicative of the selected text, accessing context data from the computer storage accessible to the computer, wherein the context data comprises data including strings derived from the graphical user interface of the target computer program, wherein the strings are recognized from outputs of the graphical user interface of the target computer program captured during actual use of the target computer program, and the data further including associations between the strings and images of the graphical user interface of the target computer program captured during the actual use of the target computer program, in which the accessing of the context data is further performed to retrieve content associated with a string that matches the selected text;
generating output data, using at least the message data, and including the retrieved content in association with the selected text, for presentation on a presentation device;
receiving an input with respect to a selected message in the message data; and
updating data for the selected message in the message data based on the input.

14. The computer-implemented process of claim 13, wherein the generated output data includes display data comprising an editing pane displaying the selected text corresponding to the message in the message data and an image pane displaying images retrieved from the context data.

15. The computer-implemented process of claim 14, further comprising displaying a plurality of retrieved images sequentially in the image pane.

16. The computer-implemented process of claim 13, wherein the output data further includes an indication of confidence of a match between the selected text and the string corresponding to the retrieved content.

17. The computer-implemented process of claim 13, wherein the context data further includes, for a recognized string from an image, a location of the string in the image, and, wherein the retrieved content comprises an image corresponding to the string that matches the selected text, and wherein, when the image is displayed, the output data further includes a highlight of the string in the image.

* * * * *